(12) United States Patent
Tabu

(10) Patent No.: US 7,529,244 B2
(45) Date of Patent: May 5, 2009

(54) ROUTING PROCESSING DEVICE AND PACKET TYPE IDENTIFICATION DEVICE

(75) Inventor: Toshiyuki Tabu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 845 days.

(21) Appl. No.: 10/656,260

(22) Filed: Sep. 8, 2003

(65) Prior Publication Data
US 2004/0052260 A1 Mar. 18, 2004

(30) Foreign Application Priority Data
Sep. 17, 2002 (JP) .............................. 2002-269841

(51) Int. Cl.
H04L 12/28 (2006.01)

(52) U.S. Cl. .................. 370/392; 370/389; 370/395.42; 370/395.52; 370/395.53

(58) Field of Classification Search ................. 370/389, 370/392
See application file for complete search history.

(56) References Cited

U.S. PATENT DOCUMENTS

| | | | | |
|---|---|---|---|---|
| 5,434,863 A | * | 7/1995 | Onishi et al. ................. 370/402 |
| 6,628,653 B1 | * | 9/2003 | Salim ......................... 370/389 |
| 2002/0012348 A1 | * | 1/2002 | Mizuhara et al. ............. 370/392 |
| 2003/0002506 A1 | * | 1/2003 | Moriwaki et al. ............. 370/392 |
| 2005/0086353 A1 | * | 4/2005 | Shirakawa et al. ........... 709/230 |
| 2006/0114924 A1 | * | 6/2006 | Yazaki et al. ................ 370/428 |
| 2007/0223474 A1 | * | 9/2007 | Shankar ...................... 370/389 |

FOREIGN PATENT DOCUMENTS

| | | |
|---|---|---|
| JP | 2000083055 | 3/2000 |
| JP | 2000349770 | 12/2000 |
| JP | 2002111712 | 4/2002 |

* cited by examiner

Primary Examiner—Rafael Pérez-Gutiérrez
Assistant Examiner—German Viana Di Prisco
(74) Attorney, Agent, or Firm—Venable LLP; James R. Burdett

(57) ABSTRACT

This invention has as an object the provision of a routing processing device and packet type identification device, which can alleviate the load on a processor performing routing processing. A routing processing device and packet type identification device of this invention comprise a packet information extraction portion, which extracts from a packet for identification a prescribed range of fields including at least one identifying information item which identifies the packet type, and a packet judgment portion, which judges the packet type based on information in a prescribed position among the extracted fields.

8 Claims, 7 Drawing Sheets

FIG. 2A UNTAGGED ETHERNET V2 (RFC 894) PACKET

| DstMAC | SrcMAC | Type | IPData | CRC |
|--------|--------|------|--------|-----|
| 6 | 6 | 2 | 46~1500 | 4 OCTETS |

FIG. 2B UNTAGGED IEEE 802.3 (RFC 1042) PACKET

| DstMAC | SrcMAC | Length | DSAPetc | Type | IPData | CRC |
|--------|--------|--------|---------|------|--------|-----|
| 6 | 6 | 2 | 5 | 2 | 38~1492 | 4 OCTETS |

FIG. 2C TAGGED ETHERNET V2 (RFC 894) PACKET

| DstMAC | SrcMAC | Tag | Type | IPData | CRC |
|--------|--------|-----|------|--------|-----|
| 6 | 6 | 4 | 2 | 46~1500 | 4 OCTETS |

FIG. 2D TAGGED IEEE 802.3 (RFC 1042) PACKET

| DstMAC | SrcMAC | Tag | Length | DSAPetc | Type | IPData | CRC |
|--------|--------|-----|--------|---------|------|--------|-----|
| 6 | 6 | 4 | 2 | 5 | 2 | 38~1492 | 4 OCTETS |

EXTRACTED FIELDS (13 OCTETS)

FIG. 4A

SETTINGS TABLE FOR UNTAGGED PACKETS

| V6EN | V6VR VALUE | V4EN | V4VR VALUE | ELEN | ELVR VALUE |
|------|------------|------|------------|------|------------|
| 1bit | 7bits      | 1bit | 7bits      | 1bit | 7bits      |

FIG. 4B

SETTINGS TABLE FOR TAGGED PACKETS

| TagID | V6EN | V6VR VALUE | V4EN | V4VR VALUE | ELEN | ELVR VALUE |
|-------|------|------------|------|------------|------|------------|
|       | 1bit | 7bits      | 1bit | 7bits      | 1bit | 7bits      |
| 0     | V6EN | V6VR VALUE | V4EN | V4VR VALUE | ELEN | ELVR VALUE |
| 1     | V6EN | V6VR VALUE | V4EN | V4VR VALUE | ELEN | ELVR VALUE |
| 2     | V6EN | V6VR VALUE | V4EN | V4VR VALUE | ELEN | ELVR VALUE |
| ......| ......| ......    | ......| ...........| ......| ......    |
| 4095  | V6EN | V6VR VALUE | V4EN | V4VR VALUE | ELEN | ELVR VALUE |

ROUTING PROCESSING DEVICE AND PACKET TYPE IDENTIFICATION DEVICE

BACKGROUND OF THE INVENTION

1. Field of the Invention

This invention relates to a routing processing device and packet type identification device, and can for example be applied to a device which distributes the processor load related to routing processing of communication packets transmitted over a network, and to a device to identify packet types based on differences in packet formats.

2. Description of Related Art

In the past, routing processing has been applied to packets transmitted over a network.

Routing processing involves selection of the optimal route to the target destination, and delivery via this route to the target destination. Routing processing requires packet classification, filtering, forwarding, and other processing. Packet classification is the classification of communication packets by type. Filtering entails judgment of whether a communication packet is to be allowed to pass or discarded, based on the transmission and reception addresses, protocol, identifier, and similar of the communication packet. Forwarding is the sending, over an appropriate selected route, of a communication packet based on the destination address of the communication packet. These kinds of processing are normally performed in a unified manner by a single general-purpose or specialized processor.

Such technology of the prior art is for example disclosed in Japanese Patent Laid-open Nos. 2000-83055, 2000-349770, and 2002-111712.

However, although in recent years there have been dramatic improvements in the circuit transmission rates of networks, the processing speeds of processors which perform routing processing have not improved sufficiently to keep pace. Consequently a considerable load is placed on a single processor which performs unified routing processing.

In recent years, there have been demands that processors performing routing processing be provided with a device to prevent improper access (such as for example a firewall) in order to compensate the high security of networks, a network load distribution device, and other high-functionality processing capabilities. Consequently, a large load has been placed on the processors performing routing processing in order to perform processing for such advanced functionality.

Hence in the technology of the prior art, alleviation of the load of routing processing placed on processors which perform routing processing has become a major issue.

In order to resolve this problem, the present invention has as an object alleviation of the load placed on processors performing routing processing. Further, because a plurality of communication packet formats are intermixed in transmission over a network, the present invention has as an object the provision of a packet type identification device which can easily identify packet types based on packet formats, and by this means can alleviate the load placed on the processor.

SUMMARY OF THE INVENTION

A routing processing device of this invention is a routing processing device which identifies one or a plurality of packet format types and performs routing processing for each packet type, and comprises a packet information extraction portion, which extracts from a packet for identification a prescribed range of fields including at least one identifying information item which identifies the packet type; a packet judgment portion, which judges the packet type based on information in a prescribed position among the extracted fields; a header imparting portion, which creates header information according to the packet type based on the judgment result of the packet judgment portion and imparts the header information to the packet; a packet sorting portion which sorts packets based on the header information imparted to packets; and, a routing processing portion which performs routing processing of packets sorted by the packet sorting portion, according to the packet type.

Further, a packet type identification device of this invention is a packet type identification device which identifies one or a plurality of types of packet formats, and comprises a packet information extraction portion which extracts from a packet for identification a prescribed range of fields including at least one identifying information item which identifies the packet type, and a packet judgment portion which judges the packet type based on information in a prescribed position among the extracted fields.

BRIEF DESCRIPTION OF THE DRAWINGS

The foregoing and other objects, features and advantages of the present invention will be better understood from the following description taken in connection with the accompanying drawings, in which:

FIG. 2A through FIG. 2D are drawings showing format examples by packet type;

FIG. 4A and FIG. 4B are drawings showing examples of settings tables;

Figure 1:
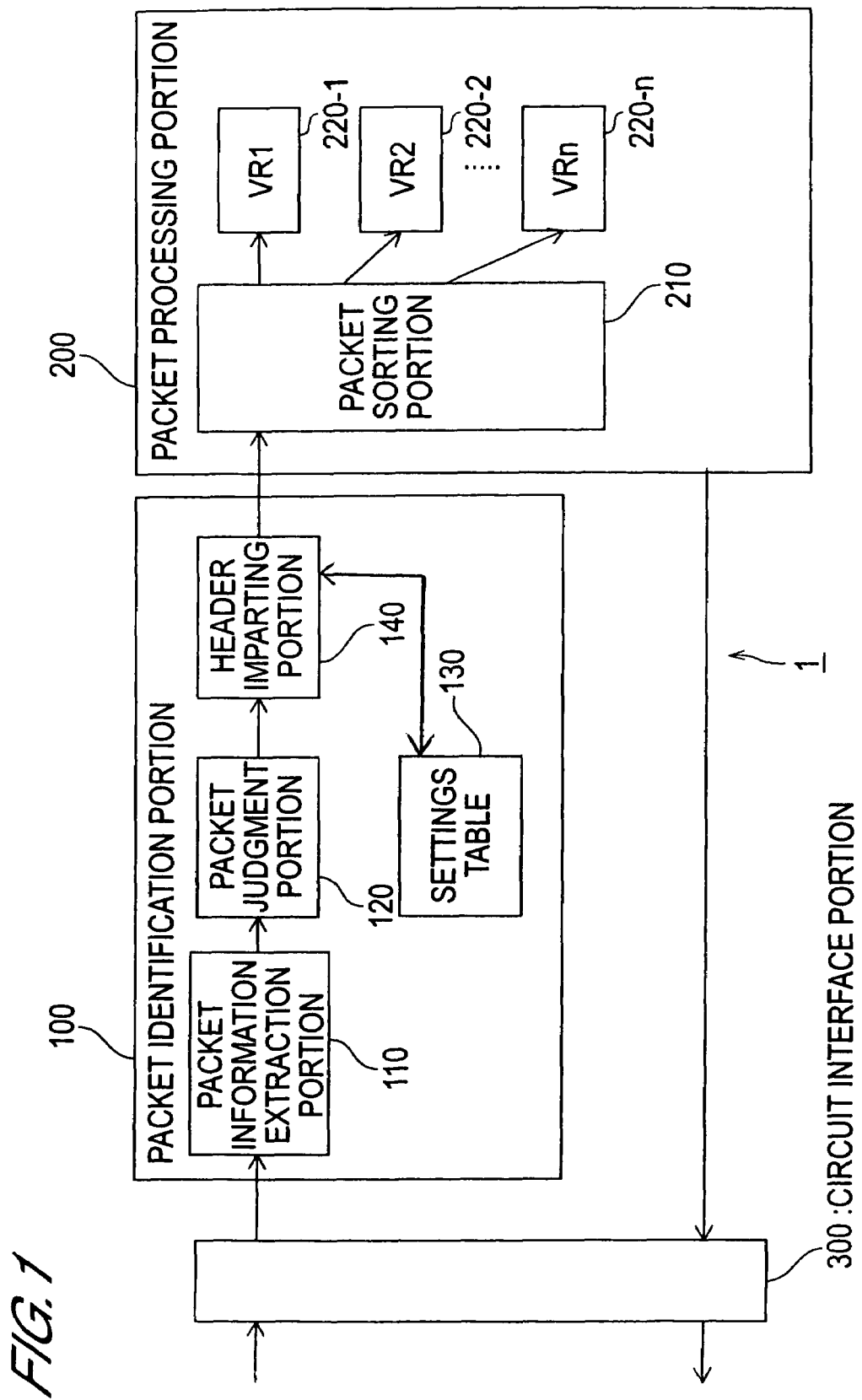
FIG. 1 is a block diagram showing the internal configuration of a routing processing device of this invention.

DESCRIPTION OF THE PREFERRED EMBODIMENTS (A) Embodiment of the Invention

Below, an embodiment of a routing processing device of this invention is explained, referring to the drawings. The drawings show this invention in summary only to a degree sufficient to aid understanding. Hence the present invention is not limited to the examples of the drawings. In the drawings, the same symbols are used to denote common elements and similar elements, and redundant explanations thereof are omitted.

Here, a routing processing device of the embodiment is assumed to be applied to a connectionless type network. A connectionless type network is, for example, a network over which transmission conforming at least to the Ethernet (a registered trademark) and IEEE (the Institute of Electrical and Electronics Engineers of the U.S.) 802.3 standards is possible.

Of course, networks to which a routing processing device of this embodiment is applied are not limited to the connectionless type, and application to a wide range of networks capable of transmitting packets in different formats is possible.

(A-1) Configuration of the Embodiment

FIG. 1 is a block diagram showing the internal configuration of a routing processing device 1 of this invention. As shown in FIG. 1, the routing processing device 1 comprises a packet identification portion 100, a packet processing portion 200, and a circuit interface portion 300.

The packet identification portion 100 has a packet information extraction portion 110, a packet judgment portion 120, a settings table 130, and a header imparting portion 140; the packet processing portion 200 has a packet sorting portion 210, and a plurality of virtual routers (VRs) 220-1 through 220-n, which function as routing processing portions.

The packet identification portion 100 receives a received packet from the circuit interface portion 300, judges the packet type based on packet information extracted from the received packet, creates header information (hereafter simply called a "header") according to the judged packet type and imparts this information to the received packet, and outputs the received packet with imparted header to the packet processing portion 200.

Below, the internal configuration of a packet identification portion 100 provided with such functions is described in detail.

The packet information extraction portion 110 receives a received packet for identification from the circuit interface portion 300, extracts a prescribed range of fields from the received packet, and outputs the extracted fields (hereafter called "extracted fields") to the packet judgment portion 120.

Here extracted fields are a prescribed range of fields comprising at least one field in which is set information which uniquely identifies the packet type (hereafter called "identifying information"), and which are common to packets for identification. Below, a field among the extracted fields in which is set identifying information is called an "identifying field".

The routing processing device 1 of this embodiment can set extracted fields such that the extraction range of extracted fields changes according to the packet format identified by the types of packets for identification. For example, in the routing processing device 1 of the embodiment, extracted fields can be set so as to enable identification of tagged packet and untagged packet types, and IPv4 packet and IPv6 packet types.

Here a "tagged packet" is a packet having an IEEE 802.1Q tag. An "IEEE 802.1Q tag" is a VLAN tag (corresponding to a "Tag" in FIG. 2) provided to add VLAN (virtual LAN) information, extending the MAC (Media Access Control) frame. An "untagged packet" is a packet not having such a tag.

FIG. 2 shows format examples for different packet types transmitted over a network. The format of each packet is, for example, as shown in FIG. 2A through FIG. 2D.

FIG. 2A shows an example of the format of an untagged IPv6 packet (an untagged Ethernet V2 packet). FIG. 2B shows an example of the format of an untagged IPv4 packet (untagged IEEE 802.3 packet). FIG. 2C shows an example of the format of a tagged IPv6 packet (tagged Ethernet packet). FIG. 2D shows an example of the format of a tagged IPv4 packet (tagged IEEE 802.3 packet).

As shown in FIG. 2, an untagged Ethernet V2 packet has a "DstMAC" field, a "SrcMAC" field, a "Type" field, an "IPData" field, and a "CRC" field. An untagged IEEE 802.3 packet has a "DstMAC" field, a "SrcMAC" field, a "Length" field, a "DSAPetc" field, a "Type" field, an "IPData" field, and a "CRC" field. A tagged Ethernet V2 packet has a "DstMAC" field, a "SrcMAC" field, a "Tag" field, a "Type" field, an "IPData" field, and a "CRC" field. And a tagged IEEE 802.3 packet has a "DstMAC" field, a "SICMAC" field, a "Tag" field, a "Length" field, a "DSAPetc" field, a "Type" field, an "IPData" field, and a "CRC" field.

In FIG. 2, "DstMAC" indicates the destination MAC address. "SrcMAC" indicates the transmission origin MAC address. "Type" indicates the Ethernet (a registered trademark) type. "Length" indicates the packet length (for an IEEE 802.3 packet). "Tag" indicates an IEEE 802.1Q tag. "DSAPetc" indicates DSAP, SSAP, CTRL, a vendor code, or similar. "IPData" indicates the IP packet data. "CRC" indicates a cyclic redundancy check.

When identifying packets, the routing processing device 1 can identify differences between the IPv4 format and the IPv6 format through values of the "Type" field. That is, the routing processing device 1 identifies the packet as an IPv6 packet when the value in the "Type" field is "0x86DD", and identifies the packet as an IPv4 packet when the value in the "Type" field is "0x0800".

Further, the routing processing device 1 can identify whether a packet is a tagged or an untagged packet by whether there is a "Tag" field.

For example, four types of format examples are shown in FIG. 2.

In FIG. 2, identifying fields (that is, the above-described fields necessary to uniquely identify the packet type) which are particular to each packet type are the sections surrounded by a bold line.

Extracted fields (that is, the above-described prescribed range of fields, common to packets to be identified, which include, at least, identifying fields) are the sections surrounded by a dotted line in the drawing, and more precisely, correspond to the 13 octets of data from the 13th octet to the 25th octet of the packet.

Of course when the routing processing device 1 identifies other packet types, the extraction range of extraction fields must be determined with consideration paid to the relation between packet types to be identified and packet formats. Also, the routing processing device 1 can appropriately modify the extraction range.

The packet judgment portion 120 receives extracted fields which have been extracted by the packet information extraction portion 110, references information in a prescribed position in the extracted fields (that is, "values" set in the field in a prescribed position within the extracted fields), and based on the reference result, judges the packet type. That is, the packet judgment portion 120 judges the packet type based on the "value" of a field at a prescribed position.

For example, in FIG. 2A through FIG. 2D, at the extracted field of the 13th octet the packet judgment portion 120 references the "value" of an identifying field of each packet at a position enabling detection of identifying fields for each type of packet, and judges the packet type. The packet judgment portion 120 of this embodiment can be set so as to reference the "value" at a position fixed temporally from the beginning of the extracted fields. By this means, the functional design of the packet judgment portion 120 (and therefore of the packet identification portion 100) can be facilitated.

Further, the position of the field referenced by the packet judgment portion 120 can be changed according to the formats of the packet types for identification, and in addition the number of positions referenced is not limited to a single position, but may be a plurality of positions. It is preferable that the number of referenced positions be the minimum number necessary to judge the packet type.

Below, judgment of packet types by the packet judgment portion 120 of the embodiment is explained in detail, referring to FIG. 3.

Figure 3:
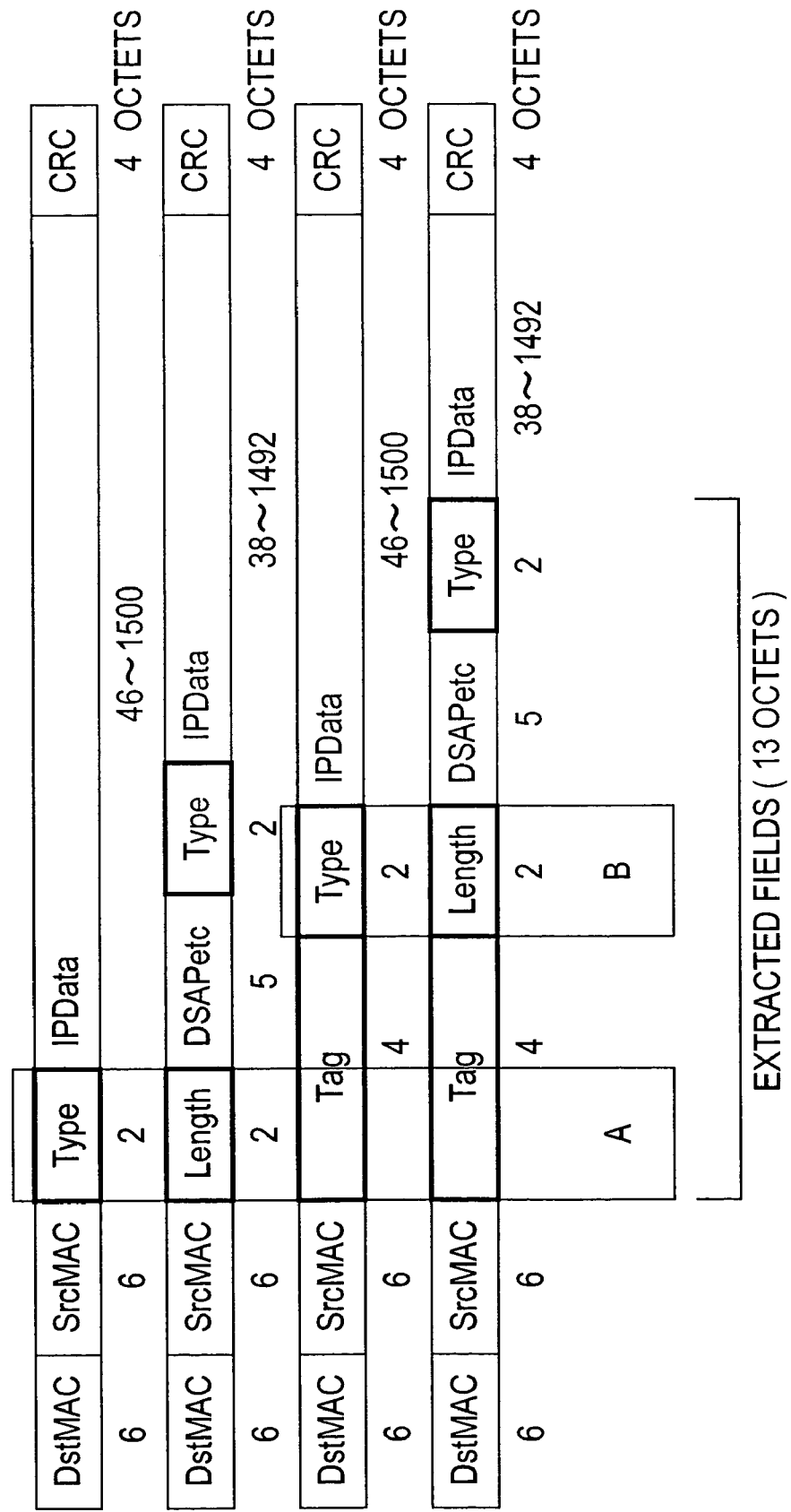
FIG. 3 is a drawing showing reference positions to judge the type of a packet.

FIG. 3 is a drawing showing reference positions to judge the type of a packet, and shows the positions of fields referenced by the packet judgment portion 120. As shown in FIG.

3, the packet judgment portion 120 of the embodiment references the "values" of the fields at positions A and B in the extracted fields.

The position A in the extracted fields is a reference position used to identify a packet as either a tagged or an untagged packet, and when the packet is an untagged packet, to identify the packet as either an IPv4 packet or as an IPv6 packet.

The position B in the extracted fields is a reference position used, when the packet is a tagged packet, to identify the packet as either an IPv4 packet or as an IPv6 packet.

Specifically, the packet judgment portion 120 references, in the 13 octets' worth of extracted fields, the "value" of the field in the first two octets from the beginning, and the "value" of the field in the two octets from the fifth octet from the beginning.

The "value" of the field is expressed in hexadecimal form; in general, "0×8100" is defined as the IEEE 802.1Q tag (that is, the "tag" described above). In general, in an IEEE 802.3 frame, the "Length" field is defined as values from "0×0" to "0×05DC".

When the packet is an untagged packet (that is, when the value at position A in the extracted fields is not a "value" corresponding to a "tag"), the packet judgment portion 120 judges whether the packet is an IPv4 packet or an IPv6 packet, based on the value at position A in the extracted fields. Also, when the packet is a tagged packet (that is, when the value at position A in the extracted fields is a value corresponding to a "tag"), the packet judgment portion 120 references position B in the extracted fields, and based on the value at position B in the extracted fields, judges whether the packet is an IPv4 packet or an IPv6 packet.

Based on the value of the "Type" field for each packet format, the packet judgement portion 120 judges whether the packet is an IPv4 packet or an IPv6 packet (hereafter called a "Type" judgment). For example, when the value of the "Type" field is "0×0800", the packet judgment portion 120 judges the packet to be an IPv4 packet, and when the value of the "Type" field is "0×86DD", judges the packet to be an IPv6 packet. When the value of the "Type" field is a "value other than those described above", the packet judgment portion 120 judges the packet to be another type of packet (other than an IPv4 packet or an IPv6 packet).

Explained in greater detail, when the value at position A in the extracted fields is "0×0 to 0×05DC" (that is, the "Length"), the packet judgment portion 120 references the "value" of the field position offset 7 octets from the beginning of the 13 octets of extracted fields (that is, offset a further 5 octets from the end of the position A). The packet judgment portion 120 then uses this value to judge the "Type" in order to identify the packet type (that is, to judge whether the packet is an IPv4 packet, an IPv6 packet, or another kind of packet). When the value is "0×0800" corresponding to an IPv4 packet, the packet judgment portion 120 then judges the packet to be an untagged IPv4 packet as shown in FIG. 2B.

When the value at position A in the extracted fields is a value other than "0×0 to 0×05DC" (that is, "Length"), the packet judgment portion 120 uses the value of position A in the extracted fields for judgment of the "Type". When the value is "0×86DD" corresponding to an IPv6 packet, the packet judgment portion 120 judges the packet to be an untagged IPv6 packet as shown in FIG. 2A.

When the value at position A in the extracted fields is "0×8100" (that is, "Tag"), the packet judgment portion 120 references the position B in the extracted fields. When the value at position B is "0×0 to 0×05DC" (that is, "Length"), the packet judgment portion 120 uses the "value" of the field position offset 11 octets from the beginning of the 13 octets of extracted fields for judgment of the "Type". When this value is "0×0800" corresponding to an IPv4 packet, the packet judgment portion 120 judges the packet to be a tagged IPv4 packet as shown in FIG. 2D.

When the value at position A in the extracted fields is "0×8100" (that is, "Tag"), the packet judgment portion 120 references position B in the extracted fields. When the value at position B is "0×0 to 0×05DC" (that is, "Length"), the packet judgment portion 120 uses the value at position B to judge the "Type". When the value is "0×86DD" corresponding to an IPv6 packet, the packet judgment portion 120 judges the packet to be a tagged IPv6 packet as shown in FIG. 2C.

In this way, the packet judgment portion 120 judges each of the packet types. Then, the packet judgment portion 120 outputs the judgment result to the header imparting portion 140.

The header imparting portion 140 creates a header which designates a virtual router 220-1 to 220-n (or which identifies a packet type) to perform routing processing according to the packet type, based on the packet type judgment result received from the packet judgment portion 120, and imparts the header to the packet.

The header imparting portion 140 receives the packet type judgment result from the packet judgment portion 120, compares the judgment result with a settings table 130 described below, reads the value of a virtual router 220-1 to 220-n (hereafter called the "VR value") set in a settings table 130 from the settings table 130, and uses the VR value thus read to create a header and impart the header to the packet.

A settings table 130 is a table to identify the virtual router 220-1 to 220-n to perform routing processing of a packet; there is a table for untagged packets and a table for tagged packets.

FIG. 4 shows examples of settings tables 130. FIG. 4A shows an example of a settings table for untagged packets; FIG. 4B shows an example of a settings table for tagged packets.

In FIG. 4, "V6EN" indicates an enabled/disabled display bit to determine whether the VR value for an IPv6 packet is enabled or not; "V6VR value" indicates the VR value of an IPv6 packet.

For example, when the "V6VR value" is enabled, an enabled display bit (for example, "1") is set in "V6EN". In this case, after confirming the enabled display bit, the packet sorting portion 210 described below sorts the packet into the corresponding virtual router 220-1 to 220-n based on the "V6VR value". When the "V6VR value" is disabled, a disabled display bit (for example, "0") is set in "V6EN". In this case, after confirming the disabled display bit, the packet sorting portion 210 discards the packet.

In the embodiment, the enabled display bit value is taken to be "1", and the disabled bit value to be "0". However, it is sufficient that enablement or disablement can be judged, and so the display bit values "1" and "0" may be reversed (that is, the enabled display bit value may be "0", and the disabled bit value may be "1").

In FIG. 4, "V4EN" indicates the enabled/disabled display bit which determines whether the VR value for an IPv4 packet is enabled or disabled, and "V4VR value" indicates the VR value for an IPv4 packet. Also, "ELEN" indicates an enabled/disabled display bit determining whether the VR value of another packet type is enabled or disabled, and "ELVR value" indicates the VR value for this other packet type.

In the embodiment, the enabled/disabled display bit is set to "V6EN" (or "V4EN" or "ELEN") according to the packet type. However, instead of setting the display bit to "V6EN" (or "V4EN" or "ELEN") in this way, an enabled/disabled bit common to all packets may be set to "V6EN" (or "V4EN" or "ELEN"). Or, the enabled/disabled display bit may be set to "V6EN" (or to "V4EN" or "ELEN") according to the packet type, and in addition a new field appended, and an enabled/disabled display bit common to all packets set therein.

When the judgment result received from the packet judgment portion 120 is an untagged packet, the header imparting portion 140 uses the settings table for untagged packets (see FIG. 4A) of the settings table 130. When the judgment result is a tagged packet, the header imparting portion 140 uses the settings table for tagged packets (see FIG. 4B) of the settings table 130.

When for example a packet is an untagged IPv6 packet, the header imparting portion 140 reads the "V6EN" and "V6VR value" from the untagged packet settings table (see FIG. 4A), and based on these values creates a header and imparts the header to the packet. When a packet is for example an untagged IPv4 packet, the header imparting portion 140 reads the "V4EN" and "V4VR value" from the untagged packet settings table (see FIG. 4A), and based on these values creates a header and imparts the header to the packet. When a packet is for example an untagged packet other than an IPv6 or IPv4 packet, the header imparting portion 140 reads the "ELEN" and "ELVR value" from the untagged packet settings table (see FIG. 4A), and based on these values creates a header and imparts the header to the packet.

Figure 5:
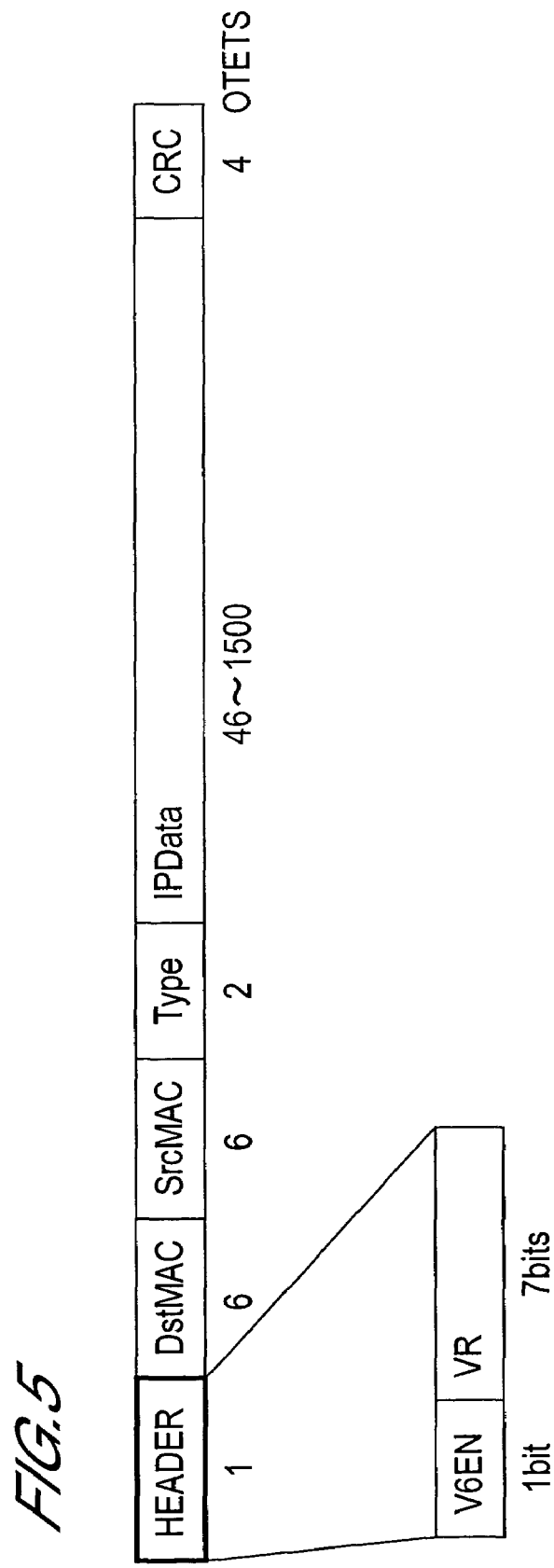
FIG. 5 is a drawing showing an example of a format comprising a header.

FIG. 5 is a drawing showing an example of a format comprising a header, and shows a format example for a header imparted by the header imparting portion 140. As shown in FIG. 5, the header has a "VREN" field and a "VR" field. "VREN" indicates the enabled/disabled display bit which determines whether the VR value is enabled or disabled; "VR" indicates the VR value. This "VREN" and "VR" correspond to the respective values read from the settings table 130.

When the packet is for example a tagged IPv6 packet, the header imparting portion 140 reads "V6EN" and the "V6VR value" from the settings table for tagged packets (see FIG. 4B) corresponding to the "Tag ID" contained in "Tag", and based on these values creates and imparts a header to the packet. When the packet is for example a tagged IPv4 packet, the header imparting portion 140 reads "V4EN" and the "V4VR value" from the settings table for tagged packets (see FIG. 4B) corresponding to the "Tag ID" contained in "Tag", and based on these values creates and imparts a header to the packet. And, when the packet is for example a tagged packet other than an IPv6 or IPv4 packet, the header imparting portion 140 reads "ELEN" and the "ELVR value" from the settings table for tagged packets (see FIG. 4B) corresponding to the "Tag ID" contained in "Tag", and based on these values creates and imparts a header to the packet.

Figure 6:
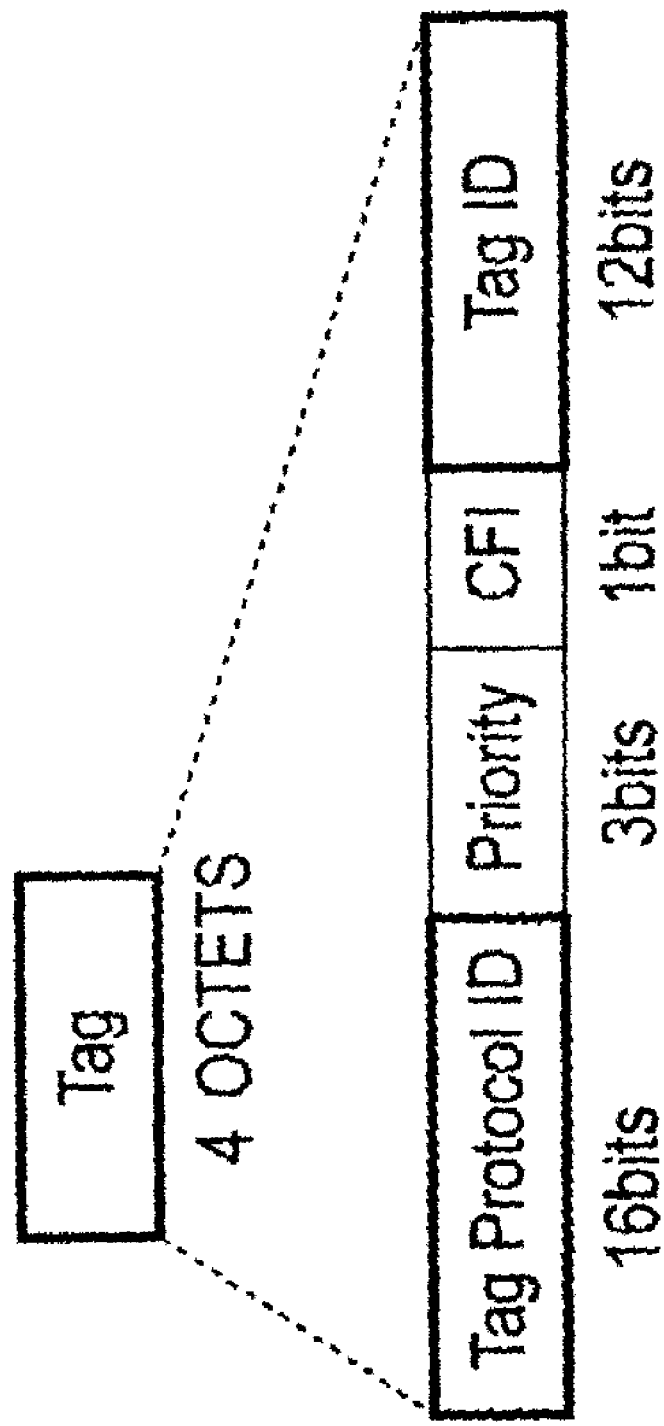
FIG. 6 is a drawing showing an example of the format contained in a tag; and, FIG. 7 is a flowchart of identification of packet types.

FIG. 6 is a drawing showing an example of the format contained in a tag. As shown in FIG. 6, "Tag" has a "Tag Protocol ID" field, a "Priority" field, a "CFI" field, and a "Tag ID" field. "Tag Protocol ID" indicates a protocol-specific identifying symbol such as "0×8100", and "Priority" indicates the priority. "CFI" indicates the standard format, and "Tag ID" is a tag-specific identifying symbol.

The packet judgment portion 120 references the "Tag Protocol ID" and judges whether the packet is a tagged packet. Based on the judgment result of the packet judgment portion 120, the header imparting portion 140 references "Tag ID" and selects the settings table 130. In FIG. 6, the fields referenced by the routing processing device 1 of this embodiment are the section surrounded by a bold line. "Tag ID" is one of 4096 identifying symbols from 0 to 4095. The settings table 130 for tagged packets has 4096 settings tables corresponding to the number of "Tag ID" values.

The header imparting portion 140 confirms the "Tag ID", reads the values set in the settings table 130 for tagged packets corresponding to the "Tag ID" ("V6EN" and the "V6VR value", or "V4EN" and the "V4VR value", or "ELEN" and the "ELVR value"), and based on these values creates and imparts a header to the packet. In this case, the creation and imparting of the header are similar to the case of an untagged packet.

In this way, the header imparting portion 140 imparts to the packet a header which designates the virtual router (VR value) 220-1 to 220-n to perform routing processing according to the packet type (or which identifies the packet type).

The packet processing portion 200 performs routing processing according to the packet type. The packet processing portion 200 has a packet sorting portion 210, and virtual routers 220-1 to 220-n. Here an explanation is given assuming that the packet processing portion 200 has a virtual router which consists of a plurality of physical routers. However, if the packet processing portion 200 can use a single virtual router to perform routing processing for each type of packet, there need not be a virtual router which consists of a plurality of physical routers.

The packet sorting portion 210 receives a packet with header imparted from the header imparting portion 140, and based on the header sorts the packet into the corresponding virtual router 220-1 to 220-n. The packet sorting portion 210 checks whether the VR value is enabled or disabled based on the "VREN" contained in the header, and if the VR value is enabled, sorts the packet into the virtual router 220-1 to 220-n corresponding to the VR value of "VR". If the VR value is disabled, the packet sorting portion 210 performs processing to discard the packet.

The header may for example be such that an enabled/disabled display bit is set in common for all packets. By this means, the packet sorting portion 210 checks the common disabled/enabled display bit, and when the display bit is disabled, performs processing to discard the packet regardless of the packet type.

The virtual routers 220-1 to 220-n perform routing processing according to the packet type. The virtual routers 220-1 to 220-n are virtually installed in a single processor. Each of the virtual routers 220-1 to 220-n performs routing processing specialized according to a packet type. After performing routing processing for each packet, the virtual routers 220-1 to 220-n output the packet to the circuit interface portion 300.

(A-2) Operation of the Embodiment

Next, the operation of the routing processing device 1 of the embodiment is explained, referring to FIG. 1.

A received packet which has arrived at the circuit interface portion 300 is output to the packet information extraction portion 110.

The packet information extraction portion 110 extracts fields in a range set in advance from the received packet, and outputs the extracted fields to the packet judgment portion 120.

The packet judgment portion 120 references a prescribed position in the extracted fields, determined in advance, and determines whether an identifying field exists at the prescribed position.

At this time, the prescribed position referenced by the packet judgment portion 120 differs according to the packet fields of the packets for identification. The position is a position enabling examination of an identifying field which is to be identified.

Figure 7:
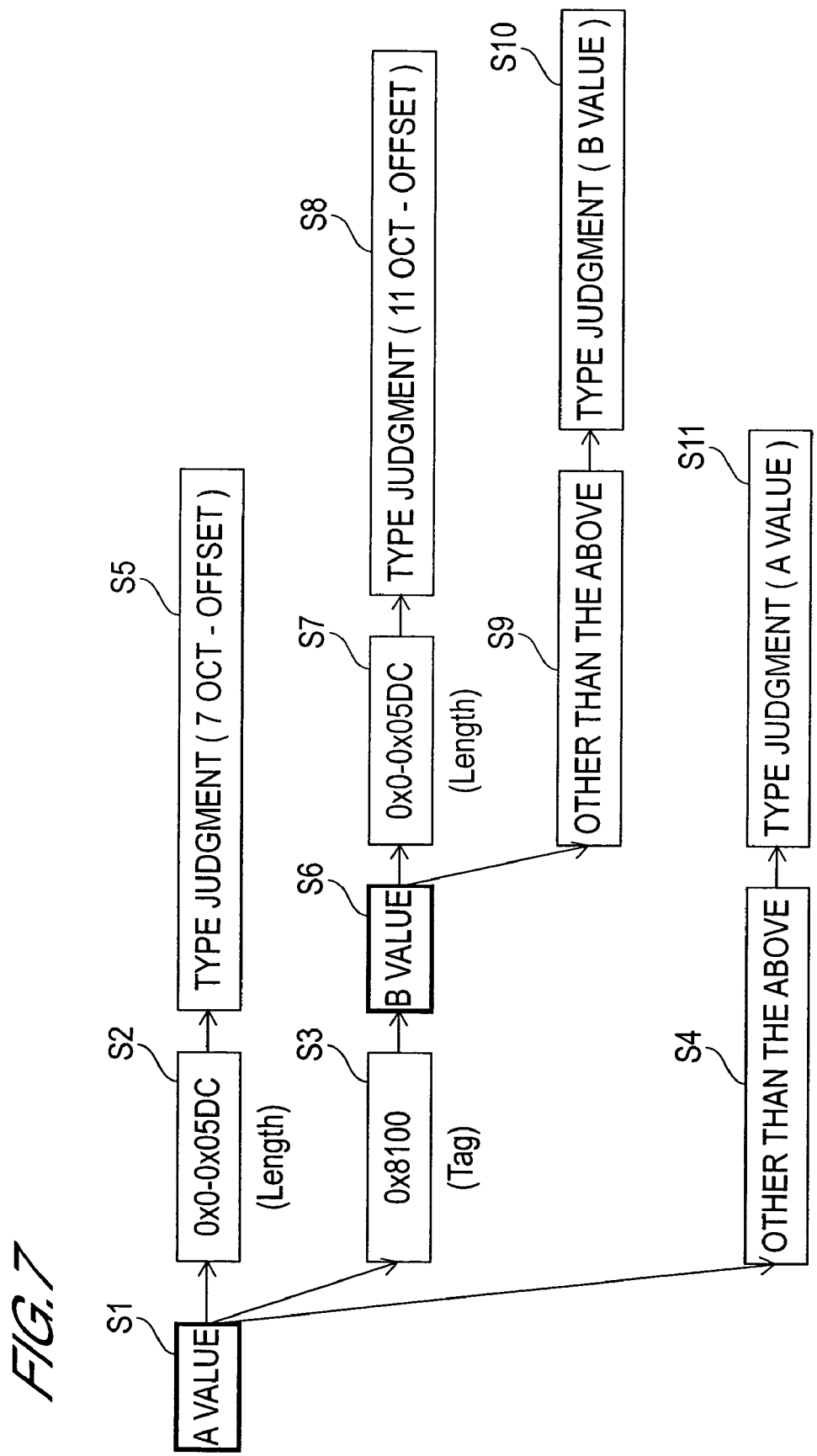

Below, the method of identification of the packet type is explained, referring to FIG. 3 and FIG. 7. FIG. 7 is a flowchart of identification of packet types.

In FIG. 7, first the packet judgment portion 120 references the value of a field at a position 2 octets from the beginning of the extracted fields (position A in FIG. 3) (S1).

The value at position A of the extracted fields is examined in order to judge whether the packet is a tagged packet or an untagged packet, and, if the packet is an untagged packet, in order to judge whether the packet is an IPv4 packet or an IPv6 packet.

When the value at position A of the extracted fields is "0×0 to 0×05DC", the packet judgment portion 120 judges the packet to be an untagged packet having a "Length" field (S2).

When the value at position A of the extracted fields is "0×8100", the packet judgment portion 120 judges the packet to be a tagged packet having a "Tag" field (S3).

When the value at position A of the extracted fields is neither "0×0 to 0×05DC" nor "0×8100", the packet judgment portion 120 judges the packet to be an untagged packet (S4).

After S2 (that is, when the value at position A of the extracted fields is "0×0 to 0×05DC"), the packet judgment portion 120 references the value of the field at the position offset seven octets from the beginning of the extracted fields (S5). This is in order to judge whether the packet is an IPv4 packet, an IPv6 packet, or a packet other than these. Here, for convenience in explanation, the case in which the packet is judged to be either an IPv4 packet or an IPv6 packet is explained.

In S5, the packet judgment portion 120 judges the value at the position offset seven octets to be "Type", and judges the packet to be either an untagged IPv4 packet, or an untagged IPv6 packet.

After S3 (that is, when the value at position A of the extracted fields is "0×8100"), the packet judgment portion 120 references the value at position B of the extracted fields (that is, the value of the field for two octets starting at the fifth octet from the beginning of the extracted fields) (S6).

When the value at position B of the extracted fields is not "0×0 to 0×05DC" (that is, when the packet is not a tagged packet having a "Length" field (S7)), the packet judgment portion 120 references the value of the field at the position offset 11 octets from the beginning of the extracted fields (S8). This is in order to judge whether the packet is a tagged IPv4 packet, or a tagged IPv6 packet.

In S8, the packet judgment portion 120 judges the value at the position offset 11 octets to be "Type", and judges whether the packet is a tagged IPv4 packet or is a tagged IPv6 packet.

When the value at position B of the extracted fields is not "0×0 to 0×05DC" (that is, when the packet is not a tagged packet having a "Length" field (S9)), the packet judgment portion 120 judges the value at position B to be "Type", and judges whether the packet is a tagged IPv4 packet or a tagged IPv6 packet (S10).

After S4 (that is, when the value at position A of the extracted fields is neither "0×0 to 0×05DC" nor "0×8100"), the packet judgment portion 120 judges the value at position A of the extracted fields to be "Type", and judges whether the packet is an untagged IPv4 packet or an untagged IPv6 packet (S11).

In this way, the packet judgment portion 120 identifies at least four types of packets.

On identifying the packet type, the packet judgment portion 120 outputs the judgment result to the header imparting portion 140. As a result, the header imparting portion 140 creates a header according to the result of packet type judgment.

For example, when the result of packet type judgment is an untagged packet, the header imparting portion 140 selects the settings table for untagged packets (see FIG. 4) from the settings table 130, reads the "enabled/disabled display bit" and "VR value" set in the settings table for untagged packets according to whether the packet is an IPv4 packet or an IPv6 packet, and creates a header.

And, when the result of packet type judgment is a tagged packet, the header imparting portion 140 selects the settings table for tagged packets (see FIG. 4) corresponding to the "Tag ID" contained in the "Tag" for the packet from the settings table 130, reads the "enabled/disabled display bit" and "VR value" set in the selected settings table, and creates a header.

The header imparting portion 140 imparts the header thus created to the packet, and outputs the packet with imparted header to the packet sorting portion 210.

The packet sorting portion 210 judges the packet type of the packet with imparted header based on the header information, and sorts the packet into one of the virtual routers 220-1 to 220-n according to the packet type.

One of the virtual routers 220-1 to 220-n, on receiving the packet, performs routing processing of the packet specialized to the packet type, and outputs the packet to the outer network, not shown, via the circuit interface portion 300.

(A-3) Advantageous Results of the Embodiment

As described above, the routing processing device 1 of this embodiment comprises a packet identification portion 100 which creates a header according to the packet type and imparts the header to the packet. By this means, the routing processing device 1 of the embodiment can use a single processor to control the virtual routers 220-1 to 220-n which perform routing processing specialized according to the packet type, based on the header. Consequently in the routing processing device 1 of the embodiment, a single processor need not perform packet classification, filtering, forwarding, and other processing, as in the case of a router of the prior art, so that routing processing can be performed with the load on the processor reduced compared with devices of the prior art.

Further, in the routing processing device 1 of the embodiment, each of the virtual routers 220-1 to 220-n can perform routing processing which is specialized according to the packet type, so that the speed of routing processing can be improved.

Also, in the routing processing device 1 of the embodiment, each of the virtual routers 220-1 to 220-n can be designed with the restriction that only routing processing specialized to a given packet type is performed, so that the functional design of each of the virtual routers 220-1 to 220-n is facilitated.

(B) Other Embodiments

In the above embodiment, the network is a combination of a network in which tagged packets and untagged packets are intermixed, and a network in which IPv4 packets and IPv6 packets are intermixed. However, the network is not limited to this configuration. For example, the formats of the plurality of packets which can arrive at the routing processing device 1 may have an identifying field with a characteristic which discriminates the packet from other packets. By this means, a network can be configured by combining a greater number of types of networks.

Further, in the above embodiment the network was assumed to be a wire-based LAN. However, the network is not thereto limited. For example, if different packet types can be discriminated, the network may be an optical communication network, a wireless LAN or similar, and in particular may be an FDDI (Fiber Distributed Data Interface), which is one form of optical communication network.

Also, in the above embodiment the routing processing device 1 processes packets conforming to the IEEE 802.3 standard simultaneously (as the same type). However, the routing processing device 1 may also process these packets as different types. In this case, by classifying IEEE 802.3 packets as different types, the routing processing device 1 selects whether to process or to discard IEEE 802.3 packets. Consequently the routing processing device 1 can also be applied in networks which do not accommodate IEEE 802.3 packets.

Further, in the above embodiment the header imparting portion 140 uses a settings table 130 to create a header according to the packet type, and imparts the header to the packet. However, the header imparting portion 140 need not use a settings table 130.

For example, the header imparting portion 140 may impart information according to the packet information in the header, and output the packet to the packet sorting portion 210. By this means the packet sorting portion 210 may judge the type of the packet containing the header and perform sorting.

Also, the packet sorting portion 210 may comprise a table of correspondence relations necessary for packet sorting, and based on the correspondence relation table and the header, may perform packet sorting.

The packet identification portion 100 in the above embodiment can be applied to devices other than the routing processing device 1. That is, the packet identification portion 100 can be configured as an independent packet identification device.

A packet identification portion 100 configured as a packet identification device can be applied to a wide range of equipment performing arbitrary processing according to packet types.

For example, a packet identification portion 100 configured as a packet identification device can be applied to equipment to selectively control passage of specific types of packets, as represented by devices to prevent improper access such as firewalls. In this case, the packet identification portion 100 configured as a packet identification device identifies packet types based on IP addresses, port numbers, and similar.

Also, a packet identification portion 100 configured as a packet identification device can for example be applied to equipment which performs priority control. In this case, the packet identification portion 100 configured as a packet identification device identifies packet types based on differences in specific information in the transfer-unit format in different layers of the packet. For example, the packet identification portion 100 identifies packet types based on the format of IP, IPX, and the like in layer 3, and identifies packet types based on the format of TCP, UDP, and the like in layer 4.

Further, a packet identification portion 100 configured as a packet identification device can be applied to equipment or systems which must withstand Denial of Service (DoS) attacks, which cause temporary interruptions of server and system service through sudden large-volume and continuous malicious processing requests issued to servers and systems.

Thus in this invention, by comprising a packet information extraction portion which extracts a prescribed range of fields containing at least one identifying information item to identify the packet type from a packet for identification, as well as a packet judgment portion which judges the packet type based on information at prescribed positions in the extracted fields, the load placed on the processor during routing processing in a network can be reduced.

What is claimed is:

1. A routing processing device which identifies one or a plurality of types of packet formats, and performs routing processing for each packet type, comprising:
   a packet information extraction portion, which extracts from a received packet for identification a prescribed range of fields including at least one identifying information item which identifies the received packet type as tagged IPv4 packet, untagged IPv4 packet, tagged IPv6 packet or untagged IPv6 packet;
   a packet judgment portion, which judges whether the received packet is a tagged packet or an untagged packet based on an identified first information item in a first pre-specified position in the extracted range of fields, including a value of tag or not, and
   (a) if the received packet is the tagged packet, identifying a second information item in a second pre-specified position in the extracted range of fields, and
      (a-1) if the second information item includes a length identifier, identifying a third information item in a third pre-specified position in the extracted range of fields, determining a type of the received packet as tagged IPv4 packet or not, based on the third information item,
      (a-2) if the second information item lacks a length identifier, identifying the second information item, determining a type of the received packet based on the second information item as tagged IPv6 packet or tagged IPv4 packet,
   (b) if the received packet is the untagged packet,
      (b-1) if the first information item includes a length identifier, identifying a fourth information item in a fourth pre-specified position in the extracted range of fields, determining a type of the received packet as tagged IPv4 packet, untagged IPv6 packet or a packet other than these, based on the fourth information item,
      (b-2) if the first information item lacks a length identifier, identifying the first information item, determining a type of the received packet based on the second information item as untagged IPv6 packet or tagged IPv4 packet;
   a header imparting portion, which creates header information according to the received packet type based on the judgment result of said packet judgment portion and imparts the header information to the packet;
   a packet sorting portion which sorts packets based on said header information imparted to the packets; and,
   a routing processing portion which performs routing processing of packets sorted by said packet sorting portion, according to the received packet type.

2. The routing processing device according to claim 1, further comprising:
   a settings table which associates packet types with said routing processing portion, and wherein said header imparting portion creates the packet header information designating said routing processing portion further based on the settings table.

3. The routing processing device according to claim 1, wherein said header imparting portion imparts header information containing discarding instruction information to the packet when the packet is not to be subjected to routing processing, and said packet sorting portion discards the packet based on said discarding instruction information.

4. The routing processing device according to claim 1, wherein the prescribed position in said extracted fields is variable.

5. A packet type identification device, which identifies one or a plurality of types of packet formats, comprising:

a packet information extraction portion, which extracts from a received packet for identification a prescribed range of fields including at least one identifying information item which identifies the received packet type as tagged IPv4 packet, untagged IPv4 packet, tagged IPv6 packet or untagged IPv6 packet; and a packet judgment portion, which judges whether the received packet is a tagged packet or an untagged packet based on an identified first information item in a first pre-specified position in the extracted range of fields, including a value of tag or not, and, (a) if the received packet is the tagged packet, identifying a second information item in a second pre-specified position in the extracted range of fields, and (a-1) if the second information item includes a length identifier, identifying a third information item in a third pre-specified position in the extracted range of fields, determining a type of the received packet as tagged IPv4 or not, based on the third information item, (a-2) if the second information item lacks a length identifier, identifying the second information item, determining a type of the received packet based on the second information item as tagged IPv6 packet or tagged IPv4 packet, (b) if the received packet is the untagged packet, (b-1) if the first information item includes a length identifier, identifying a fourth information item in a fourth pre-specified position in the extracted range of fields, determining a type of the received packet as tagged IPv4 packet, untagged IPv6 packet or a packet other than these, based on the fourth information item, (b-2) if the first information item lacks a length identifier, identifying the first information item, determining a type of the received packet based on the second information item as untagged IPv6 packet or tagged IPv4 packet.

6. The device according to claim 1, wherein:

if the identifying information item in the first prescribed position lacks the type identifier, the packet judgment portion judges the packet type based on whether the identifying information item in a second prescribed position among the extracted fields includes one of the type or length identifier.

7. The device according to claim 5, wherein:

if the identifying information item in the first prescribed position lacks the type identifier, the packet judgment portion judges the packet type based on whether the identifying information item in a second prescribed position among the extracted fields includes one of the type or length identifier.

8. A method, comprising:

receiving a packet;

extracting a pre-specified range of fields from the received packet;

identifying a first information item in a first pre-specified position in the extracted range of fields;

based on the identified first information item including a value of tag or not, determining whether the received packet is a tagged packet or an untagged packet, and (a) if the received packet is the tagged packet, identifying a second information item in a second pre-specified position in the extracted range of fields, and (a-1) if the second information item includes a length identifier, identifying a third information item in a third pre-specified position in the extracted range of fields, determining a type of the received packet as tagged IPv4 packet or not, based on the third information item, (a-2) if the second information item lacks a length identifier, identifying the second information item, determining a type of the received packet based on the second information item as tagged IPv6 packet or tagged IPv4 packet, (b) if the received packet is the untagged packet, (b-1) if the first information item includes a length identifier, identifying a fourth information item in a fourth pre-specified position in the extracted range of fields, determining a type of the received packet as tagged IPv4 packet, untagged IPv6 packet or a packet other than these, based on the fourth information item, (b-2) if the first information item lacks a length identifier, identifying the first information item, determining a type of the received packet based on the second information item as untagged IPv6 packet or tagged IPv4 packet;

creating header information based on the determined packet type; and routing the packets based on the packet type.

* * * * *